United States Patent [19]
Kahle et al.

[11] Patent Number: 5,812,823
[45] Date of Patent: Sep. 22, 1998

[54] METHOD AND SYSTEM FOR PERFORMING AN EMULATION CONTEXT SAVE AND RESTORE THAT IS TRANSPARENT TO THE OPERATING SYSTEM

[75] Inventors: James Allan Kahle; Soummya Mallick; Arturo Martin-de-Nicolas, all of Austin, Tex.

[73] Assignee: International Business Machines Corporation, Armonk, N.Y.

[21] Appl. No.: 581,794

[22] Filed: Jan. 2, 1996

[51] Int. Cl.[6] .................................................. G06F 9/455
[52] U.S. Cl. .......................... 395/500; 395/563; 395/569; 395/570
[58] Field of Search ..................... 395/500, 563, 395/567, 569, 570, 527, 385, 580, 584

[56] References Cited

U.S. PATENT DOCUMENTS

| | | | |
|---|---|---|---|
| 4,445,173 | 4/1984 | Pilat et al. | 395/569 |
| 4,514,803 | 4/1985 | Agnew et al. | 364/200 |
| 4,591,982 | 5/1986 | Buonomo et al. | 364/200 |
| 4,714,993 | 12/1987 | Livingston et al. | 364/200 |
| 4,841,476 | 6/1989 | Mitchell et al. | 364/900 |
| 4,888,680 | 12/1989 | Sander et al. | 364/200 |
| 4,926,322 | 5/1990 | Stimac et al. | 364/200 |
| 4,954,942 | 9/1990 | Masuda et al. | 364/200 |
| 5,008,812 | 4/1991 | Bhandarkar et al. | 395/569 |
| 5,012,403 | 4/1991 | Keller et al. | 395/569 |
| 5,155,809 | 10/1992 | Baker et al. | 395/200 |
| 5,179,691 | 1/1993 | O'Brien et al. | 395/500 |
| 5,230,069 | 7/1993 | Brelsford et al. | 395/500 |
| 5,241,679 | 8/1993 | Nakagawa et al. | 395/569 |
| 5,283,868 | 2/1994 | Baker et al. | 395/200 |
| 5,307,502 | 4/1994 | Watanabe et al. | 395/569 |
| 5,313,648 | 5/1994 | Ehlig et al. | 395/569 |
| 5,319,792 | 6/1994 | Ehlig et al. | 395/569 |
| 5,321,828 | 6/1994 | Phillips et al. | 395/500 |
| 5,339,417 | 8/1994 | Connell et al. | 395/650 |
| 5,339,435 | 8/1994 | Lubkin et al. | 395/500 |
| 5,361,337 | 11/1994 | Okiu | 395/569 |
| 5,361,375 | 11/1994 | Ogi | 395/800 |
| 5,367,661 | 11/1994 | Hough et al. | 395/500 |
| 5,386,563 | 1/1995 | Thomas | 395/569 |
| 5,414,864 | 5/1995 | Koizumi | 395/569 |
| 5,428,779 | 6/1995 | Allegrucci et al. | 395/569 |
| 5,438,669 | 8/1995 | Nakazawa et al. | 395/563 |
| 5,448,707 | 9/1995 | Hinton et al. | 395/569 |
| 5,495,587 | 2/1996 | Comfort et al. | 395/569 |
| 5,517,664 | 5/1996 | Watanabe et al. | 395/569 |
| 5,524,250 | 6/1996 | Chesson et al. | 395/569 |
| 5,550,993 | 8/1996 | Ehlig et al. | 395/570 |
| 5,555,414 | 9/1996 | Hough et al. | 395/733 |
| 5,574,873 | 11/1996 | Davidian | 395/500 |
| 5,623,617 | 4/1997 | Davidian | 395/500 |
| 5,649,203 | 7/1997 | Sites | 395/569 |

OTHER PUBLICATIONS

MC68881/MC68882 Floating Point Coprocessor User's Manual Motorola, Prentice Hall.
Report, "Sophisticated Prime 550 is aimed at business users", Which Computers, vol. 3, No. 12, Dec. 1979, pp. 33–37.

Primary Examiner—Kevin J. Teska
Assistant Examiner—Tyrone V. Walker
Attorney, Agent, or Firm—Sawyer & Associates; Casimer K. Salys

[57] ABSTRACT

A system and method for performing an emulation context switch save and restore in a processor that executes host applications and emulates guest applications. The processor includes an operating system and a first register that is saved and restored by the operating system during a host application context switch. The method and system comprises renaming the special-purpose register to the first register when emulating guest applications. When an emulation context switch occurs, a context save and restore of the special-purpose register is performed through the first register without operating system modification.

17 Claims, 5 Drawing Sheets

METHOD AND SYSTEM FOR PERFORMING AN EMULATION CONTEXT SAVE AND RESTORE THAT IS TRANSPARENT TO THE OPERATING SYSTEM

FIELD OF THE INVENTION

The present invention relates to a method and system for emulating guest instructions in a host processor, and more particularly to a method and system for performing an emulation context save that is transparent to the operating system.

BACKGROUND OF THE INVENTION

There are two methods for emulating in software a guest instruction set, such as the Intel x86 instruction set, on a host processor, such as the Motorola PowerPC™. The first method is known as interpretation, which uses an interpreter, and the second as dynamic translation, which uses a dynamic translator. Interpreters mimic the fetch, decode, and execute cycles performed by hardware in traditional host processors. Dynamic translators fetch and decode a block of guest instructions and translate them into host instructions, which are then reused. Each method has strengths and weaknesses.

Interpreters typically use less memory, but perform slower than dynamic translators. Dynamic translators perform well when the guest program include parts that are frequently reused. But dynamic translators perform poorly when the guest program modifies parts that had previously been translated.

The assignee of the present application has developed hardware that assists software emulation methods in order to obtain a solution that has the positive characteristics of both methods: the small size of the interpreter and the speed of execution of the dynamic translator. Before the assisting hardware is used, the sequence of host instructions necessary to perform the function of each guest instruction are compiled into separate functions, called semantic routines, and stored in memory. The hardware works in conjunction with software to fetch guest instructions, decode them, and dispatch the corresponding semantic routine in the host processor.

A multithreaded processor is capable of executing several applications at once. The processor creates a separate processes for each, and the processor's operating system causes the processor to time slice between the processes by swapping-out one processes and then swapping-in another. This is known as a context switch. As the processor executes a process, instructions and variables are temporarily stored in general-purpose registers and floating-point registers. As the process is swapped-out during a context switch, the operating system saves the contents of the registers used by the process. This is referred to as a context save. When the process is subsequently swapped-back in, the operating system restores the register contents. This is referred to as a context restore.

If the processor attempted to time slice between two guest applications, then a context switch would also occurs in the hardware assist unit. The hardware assist unit however, utilizes special-purpose registers on which current operating systems do not have the ability to perform a context save and restore.

A solution to this problem would be to provide operating systems with the ability to perform context saves and restores on special-purpose registers. This, however, would require modifications to all native operating systems, such as AIX and System 7. Typically, modifications to operating systems are not implemented until the next release of the operating system, which usually takes several years. Therefore, the availability of a processor capable of performing an emulation context switch on guest applications would be delayed accordingly.

What is needed therefore is a system and method for performing an emulation context save and restore that is transparent to operating system. The present invention addresses such a need.

SUMMARY OF THE INVENTION

The present invention is method and system for performing an emulation context switch save and restore in a processor that executes host applications and emulates guest applications. The processor includes an operating system and a first register that is saved and restored by the operating system during a host application context switch. The method and system comprises renaming the special-purpose register to the first register when emulating guest applications. When an emulation context switch occurs, a context save and restore of the special-purpose register is performed through the first register without operating system modification.

According to the system and method disclosed herein, the present invention enables emulation context switch functionality to be added to the processor with user level instructions only, thereby avoiding upgrades to the operating system.

DESCRIPTION OF THE INVENTION

The present invention relates to an improvement in emulating guest instructions in a host processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be according the widest scope consistent with the principles and features described herein.

Figure 1:
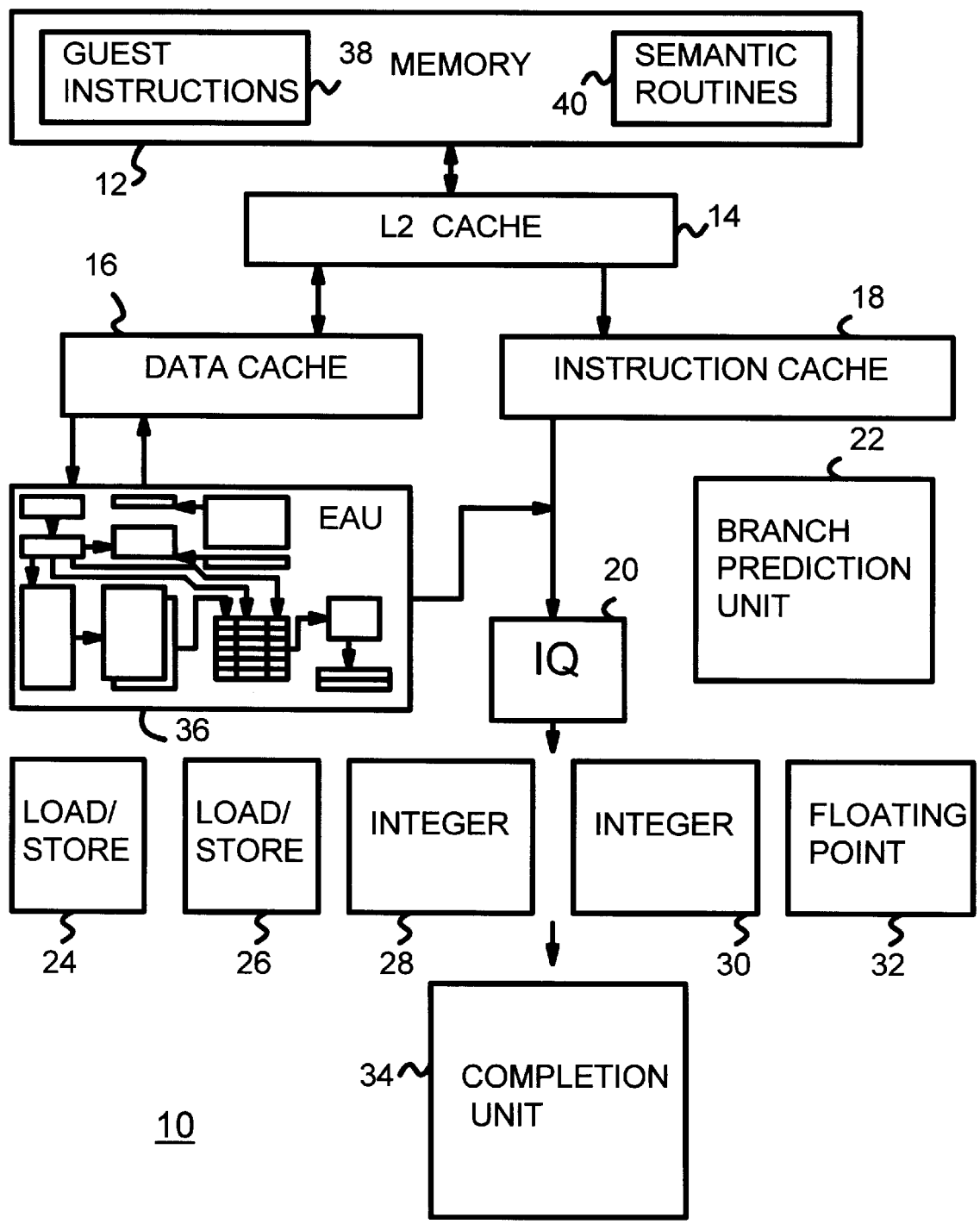
FIG. 1 is a block diagram depicting a high-level architecture of a host processor.

FIG. 1 is a block diagram depicting a high-level architecture of a host processor 10. Typically, the processor 10 executes native software instructions using various hardware components, such as a memory 12, a level 2 (L2) cache 14, a data cache 16, an instruction cache (IC) 18, an instruction queue (IQ) 20, a branch prediction unit 22, functional units 24–32, and a completion buffer 34.

In a preferred embodiment of the present invention, the processor 10 is a PowerPC manufactured by Motorola that executes a PowerPC (PPC) instruction set. Besides executing the PPC instruction set, the processor 10 is also capable of emulating a plurality of guest instructions 38, such as Intel x86 instructions and Motorola 68K Complex Instruction Set Computers (CISC) instructions.

The component responsible for assisting the processor 10 in emulating guest instructions 38 is an emulation assist unit (EAU) 36. To enable the processor 10 to emulate the guest instructions 38, each guest instruction 38 is first translated into a corresponding set of host instructions, called a semantic routine 40, that perform the function of guest instruction 38 in the host processor 10. Each semantic routine 40 is stored at a specific address location in the memory 12. The guest instructions 38 (and data) are also stored in the memory 12.

In operation, the processor 10 caches the guest instructions 38 and data into the L2 cache 14 and the data cache 16, respectively. The EAU 36 fetches and decodes the guest instructions 38, and then maps each of the guest instructions 38 into the host memory address of the corresponding semantic routine 40. The processor 10 fetches the semantic routine 40 located at the specified memory address into the instruction cache 18. The host instructions contained in the semantic routine 40 are then transferred to the IQ 20. Each host instruction is then decoded and executed using the branch prediction unit 22 and the functional units 24-32. After the semantic routine 40 is executed and the results stored in the completion buffer 34, the EAU 36 maps the host address of the next guest instruction 38, and the process repeats.

Figure 2:
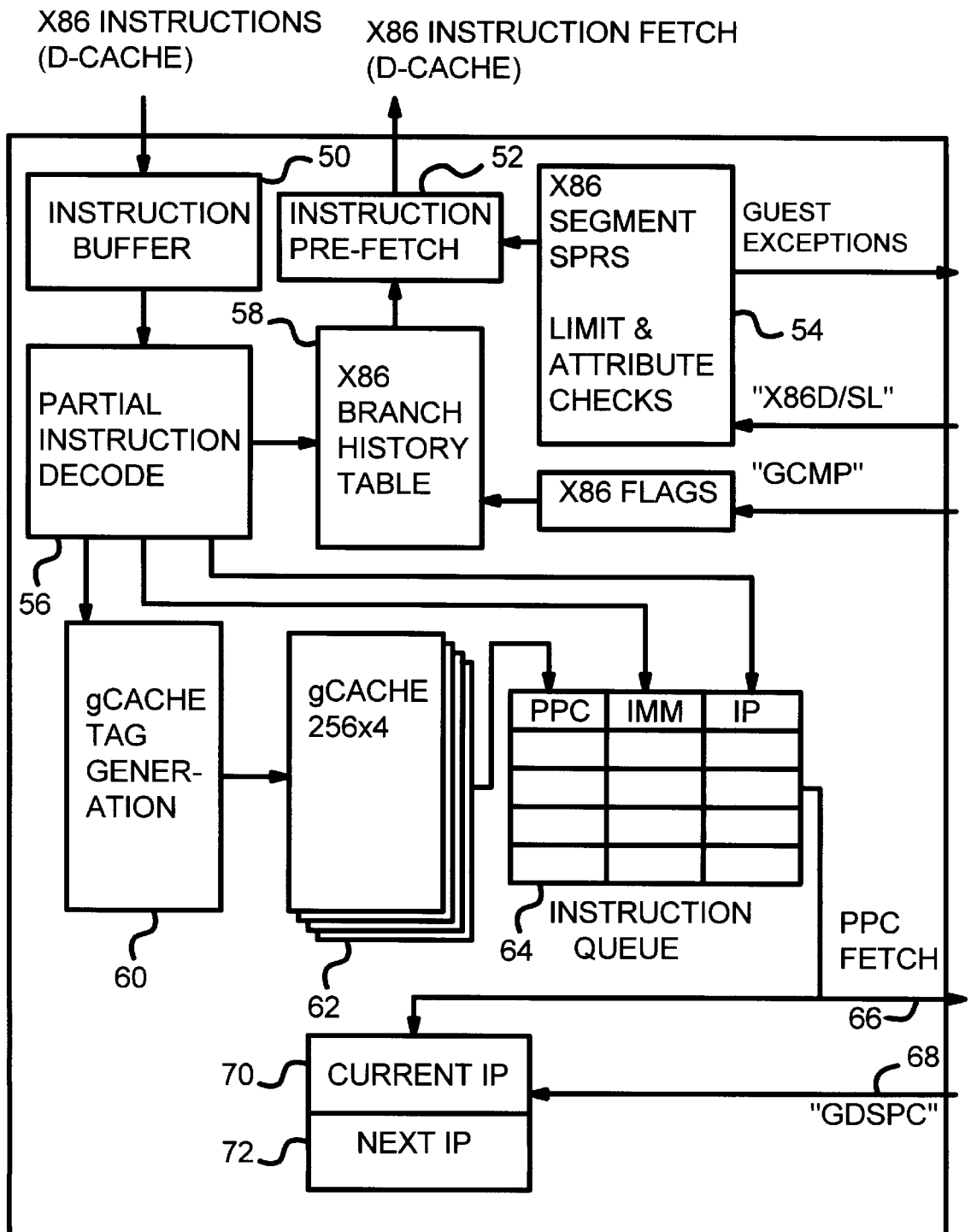
FIG. 2 is a block diagram illustrating an emulation assist unit.

Referring now to FIG. 2, a block diagram of the EAU 36 is shown. The EAU 36 includes an instruction buffer 50, a pre-fetch unit 52, special purpose registers (SPRs) 54, a decode unit 56, a branch history table 58, a tag generation unit 60, a guest cache (gcache) 62, and a gcache instruction queue 64. The function of the EAU 36 is assist the processor 10 in emulating guest instructions 38 using a direct mapping scheme.

A guest instruction 38 is first pre-fetched by the pre-fetch unit 52 from the data cache 16. The guest instruction 38 is then loaded into the instruction buffer 50 and transferred to the decode unit 56. Since a direct mapping of a guest instruction 38 to a host address is complicated by its syntax, the decode unit 56 is used to parse or decode a guest instruction 38 to determine length, branch type, and immediate data. If the instruction 38 is a branch, the branch history table 58 is used to predict the next pre-fetch address.

The gcache 62 is an array that includes an entry for each semantic routine 40 and its corresponding host memory address. After the guest instruction 38 is decoded, the tag generation unit 60 converts the instruction 38 into a unique opcode tag, and the opcode tag is used as an index to the gcache 62 to access the corresponding semantic routine 40 address.

As guest instructions 38 are decoded and the corresponding semantic routines 40 become known, the semantic routines 40 and their addresses are stored in the gcache instruction queue 64. Each entry in the instruction queue 64 contains the host address of a semantic routine 40, the immediate data that was contained in the guest instruction 38, and a guest instruction pointer.

Referring to both FIGS. 1 and 2, the processor 10 fetches the first entry in the instruction queue 64 via line 66, and retrieves the appropriate semantic routine 40 from memory 12 for execution. The last instruction in each semantic routine 40 is a branch instruction, which in a preferred embodiment, is a guest dispatch complete (gdisc) instruction 68. When the processor 10 fetches and decodes a gdisc instruction 68, it causes the processor 10 to fetch, via line 68, the address of the next semantic routine 40 from the instruction queue 64.

In a preferred embodiment, the address of the next semantic routine 40 to be executed is stored in the current instruction pointer (IP) 70. The decode of the gdisc instruction 68 also causes the next IP 72 to be moved into the current IP 72. Also in a preferred embodiment, the gdisc instruction is an unconditional branch instruction, but any instruction that causes the processor to fetch the next semantic routine may be used.

Referring again to FIG. 1, besides emulating guest instructions 38 from guest applications, the processor 10 is capable of multithreading several host applications by time-slicing between the applications. Some of the host applications that are executed by the processor 10 perform floating-point operations, which are handled by the floating-point unit 32.

Figure 3:
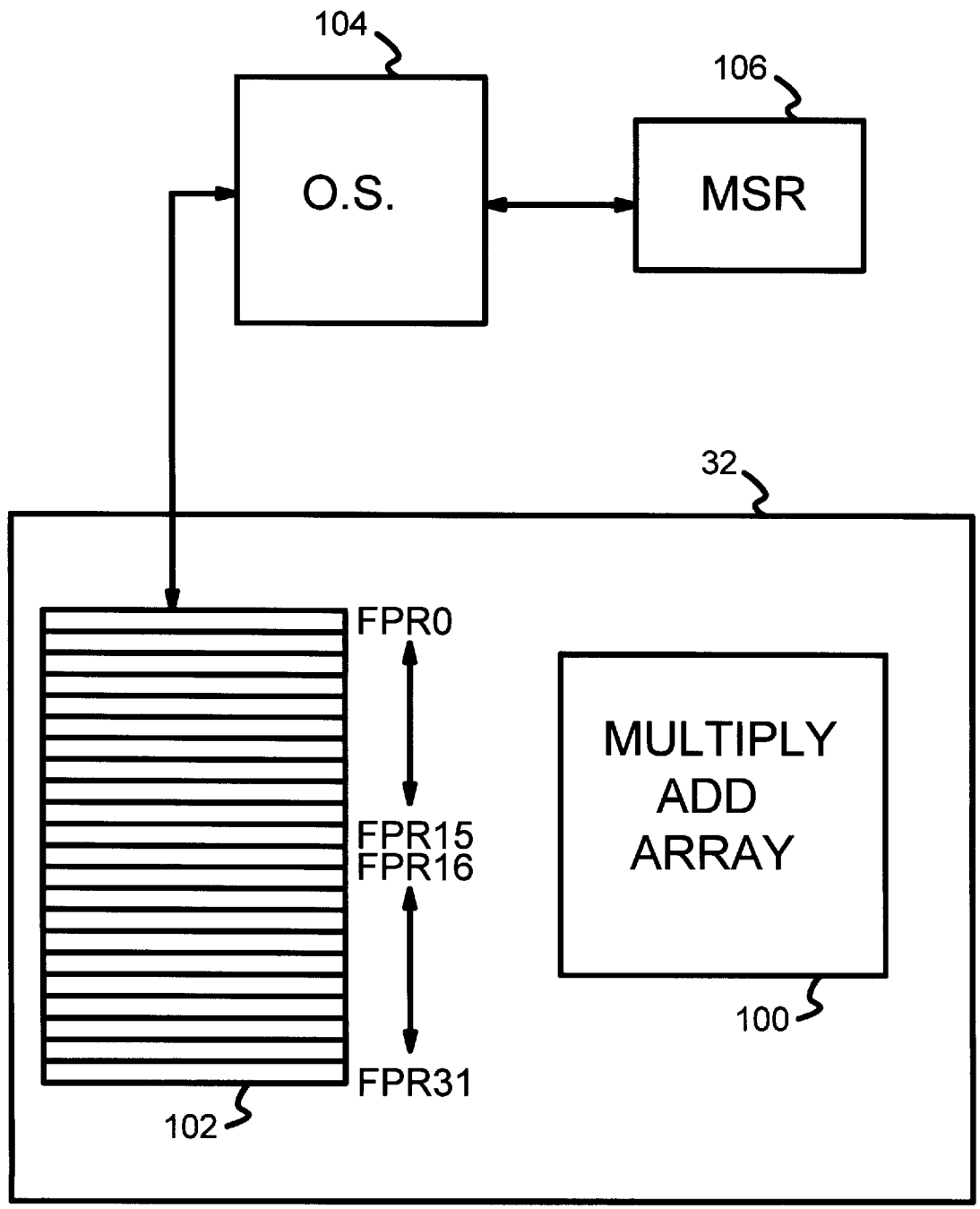
FIG. 3 is a block diagram of the floating-point unit 2.

FIG. 3 is a block diagram of the floating-point unit 32. The floating-point unit 32 includes a multiply-add array 100, and thirty-two (0-31) floating-point registers (FPRs) 102. The multiply-add array 100 performs floating-point operations, such as multiply, add, divide, and multiply-add. The FPRs 102 are used to store the values generated by a floating-point application as the application executes.

When a floating-point application is swapped-out during a context switch, the operating system 104 performs a context save on those FPRs 102 used by the application as follows. When another application is swapped-in that subsequently executes a floating-point instruction, the floating-point instruction causes what is known as a floating-point not available (FPNA) exception. The FPNA exception is an interrupt that causes the operating system 104 to save the contents of the previous application and to reset the FPNA so that the new application can use the FPRs 102.

Referring again to FIG. 2, as stated above, guest applications (applications comprising guest instructions) are emulated by the EAU 36, which accesses the SPRs 54. Current operating systems 104, however, do not have the ability to perform a context save and restore on the SPRs 54. Therefore, two guest applications cannot be multithreaded on the processor 10 without modifying the operating system 104 to access to the SPRs 54 when an emulation context switch occurs. As state previously, such a modification to the operating system would not be implemented for years, delaying the availability of a processor 10 that can multi-thread guest applications.

The present invention is method and system for performing an emulation context save and restore without modifying the operating system 104. This is accomplished by renaming the SPRs 54 to FPRs 102 so that the operating system 104 handles an EAU context switch as a floating-point application. To more particularly illustrate the method and system in accordance with the present invention, refer now to FIG. 4 depicting a block diagram of one embodiment of such a system.

Figure 4:
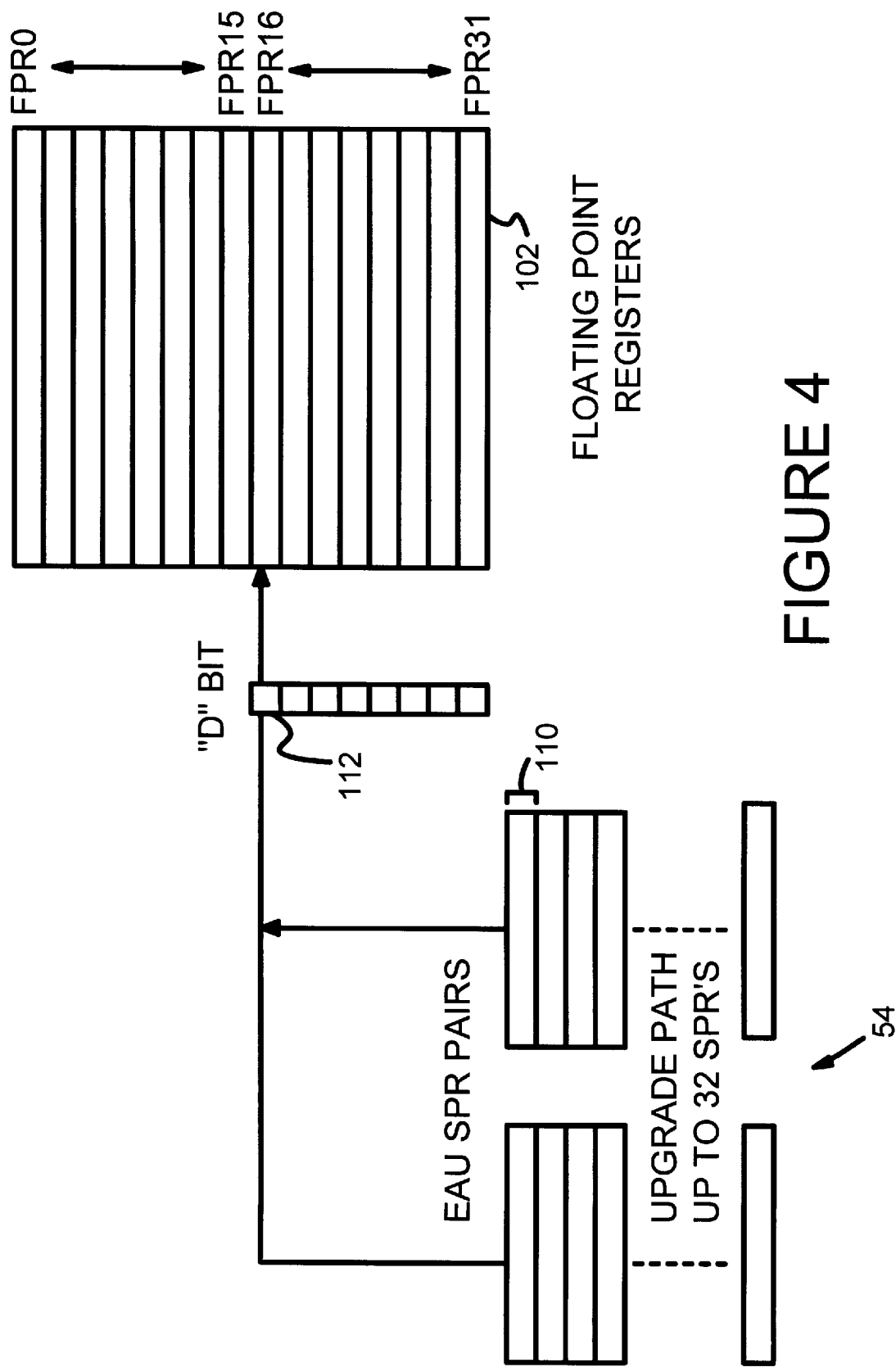
FIG. 4 is a block diagram illustrating the renaming of SPRs to FPRs in accordance with the present invention.

FIG. 4 is a block diagram illustrating the renaming of SPRs 54 to FPRs 102 in accordance with the present invention to allow an emulation context switch to be performed as a floating-point context switch. According to the present invention, SPR pairs 110 are renamed to reference a single FPR 104 for the purpose of a context save and restore. In a preferred embodiment, the SPR pairs 110 are renamed to FPR16 through FPR31 only.

Associated with of the SPR pairs 110 and the corresponding FPR 104 is a direction (D) bit 112, which points to the most current value of the FPR 104. The D bit 112 indicates whether a guest application is to access the contents of the SPR pair 110 or the contents of the corresponding FPR 104. In a preferred embodiment the D bit 112 is either set "1" to indicate that the SPR 54 contains the most current value, or reset "0" to indicate that the FPR 104 contains the most current value. By renaming the SPR pairs 110 to the FPUs 102, the present invention enables EAU context switch functionality to be added to the processor 10 with user-level instructions only, thereby avoiding upgrades to the operating system.

Figure 5:
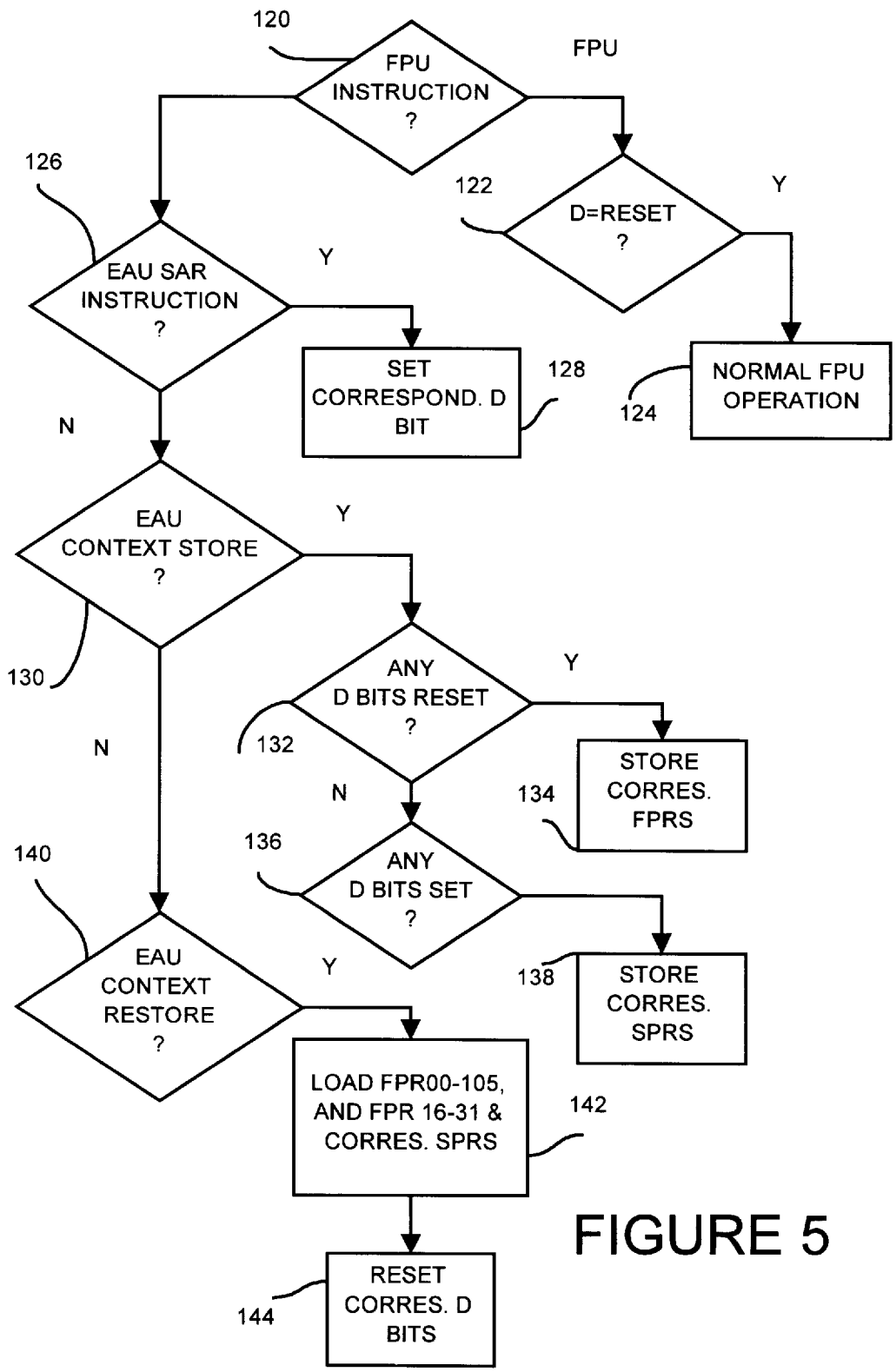
FIG. 5 is flow chart depicting the general operating rules of the present invention.

FIG. 5 is flow chart depicting the general operating rules of the present invention. The FPRs 102 may be used by either user-level EAU instructions that update FPR16–FPR31 during an EAU context switch or by user-level floating-point instructions. It is first determined whether the instruction is a floating-point instruction or an EAU instruction that modifies an SPR 54 in step 120. If the instruction is an EAU instruction that modifies an FPR 102, the process proceeds to step 122.

Floating-point applications access FPR16–FPR31. When a floating-point application is swapped-in after being swapped-out, the FPRs 102 previously used by the application must be restored. Therefore, the D bit 112 is reset during floating-point instructions. Thus, when the instruction is a floating-point instruction that reads FPR16–FPR31, and the D bit 112 is reset in step 122, then normal FPU 32 instruction occurs in step 124.

If the instruction is an EAU instruction, then the type of EAU instruction must be determined. If the instruction modifies an SPR 54 in step 126, then the D bit 112 of the corresponding FPR 104 is set in step 128. If the EAU instruction is a context store in step 130, and if any of the D bits 112 are reset in step 132, then the corresponding FPRs 102 are stored in step 134. If any of the D bits 112 are set in step 136, then the corresponding SPR pairs 112 are stored in step 138.

If the EAU instruction is a context restore in step 140, then FPR00–FPR15 are updated, and both the FPRs 102 and the SPR pairs 112 are updated for FPR16–FPR31 in step 142. The D bits 112 are then reset for the particular FPRs 102 that were loaded since the FPRs 102 now contains the most current value.

A method and system has been disclosed that provides an emulation context save and restore that is transparent to the operating system. This is accomplished by renaming EAU SPRs to FPRs so that the operating system handles an EAU context switch as a floating-point application.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing emulation context switch save and restore in a processor that executes host applications and emulates guest applications, the processor including an operating system and a first register that is saved and restored by the operating system during a host application context switch, the method comprising the step of:

(a) renaming a special-purpose register to the first register when emulating guest applications, wherein a floating-point register is provided as the first register; and (b) performing an emulation context switch, wherein a context save and restore of the special-purpose register is performed through the first register without operating system modification.

2. A method as in claim 1 wherein step (b) further includes the step of:

(b1) performing the emulation context switch as a floating-point application.

3. A method as in claim 2 wherein step (a) further includes the step of:

(a2) associating a direction bit with the special-purpose register and the floating-point register to indicate whether the special-purpose register or the floating-point register contains the most current value.

4. A method as in claim 3 wherein step (b) further includes the step of:

(b2) setting the direction bit to indicate that the special-purpose register contains the most current value.

5. A method as in claim 4 wherein step (b) further includes the step of:

(b3) resetting the direction bit to indicate that the floating-point register contains the most current value.

6. A method as in claim 5 wherein step (b) further includes the step of:

(b4) when performing an emulation context store, storing the contents of the special-purpose register if the direction bit is set, and storing the contents of the floating-point register if the direction bit is reset.

7. A method as in claim 6 wherein step (b) further includes the steps of:

(b4) when performing an emulation context restore, loading the floating-point register and the special-purpose register; and (b5) resetting the direction bit.

8. A method as in claim 7 wherein a pair of special-purpose registers is renamed to the floating-point register.

9. A processor that executes host applications and emulates guest applications, the processor comprising:

an operating system;

a first register that is saved and restored by the operating system during a host application context switch;

a special-purpose register;

means for renaming the special-purpose register to the first register when emulating guest applications, wherein the first register is a floating-point register; and means for performing an emulation context save and restore of the special-purpose register through the first register without operating system modification, wherein the means for performing an emulation context save and restore of the special-purpose register are user-level instructions.

10. A processor as in claim 9 wherein the operating system performs the emulation context save and restore as a floating-point application.

11. A processor as in claim 10 further including a direction bit associated with the special-purpose register and the floating-point register to indicate whether the special-purpose register or the floating-point register contains the most current value.

12. A processor as in claim 11 wherein the direction bit is set to indicate that the special-purpose register contains the most current value.

13. A processor as in claim 12 wherein the direction bit is reset to indicate that the floating-point register contains the most current value.

14. A processor as in claim 13 wherein when an emulation context store is performed, if the direction bit is set, then the operating system stores the contents of the special-purpose register, and if the direction bit is reset, then the operating system stores the contents of the floating-point register.

15. A processor as in claim 14 wherein when an emulation context restore is performed, the operating system loads the floating-point register and the special-purpose register, and resets the direction bit.

16. A processor as in claim 15 wherein a pair of special-purpose registers is renamed to the floating-point register.

17. A processor for executing host applications and emulating guest applications, each of the guest applications including guest instructions, the processor comprising:

- a memory for storing semantic routines at specific addresses for emulating the function of the guest instructions;
- an emulation assist unit for decoding guest instructions and dispatching a corresponding semantic routine, the emulation assist unit including, a plurality of special-purpose registers for storing a plurality of entries relating to the guest instructions;
- a floating-point unit for processing host application floating-point instructions, the floating-point unit including a plurality of floating-point registers for containing values, wherein each pair of special-purpose registers are renamed to a particular floating-point register; and
- a direction bit associated with each pair of special-purpose registers and the corresponding floating-point register to indicate whether the pair of special-purpose registers or the corresponding floating-point register contains the most current value;
- wherein the operating system is responsive to the direction bit to perform an emulation context switch as a floating-point application, wherein a context save and restore of the special-purpose registers is performed using the floating-point registers without operating system modification.

* * * * *